(12) United States Patent
Dorney

(10) Patent No.: US 7,617,850 B1
(45) Date of Patent: Nov. 17, 2009

(54) BEVERAGE DISPENSING SYSTEM

(75) Inventor: Peter Dorney, Winter Springs, FL (US)

(73) Assignee: ValidFill LLC, Sarasota, FL (US)

( * ) Notice: Subject to any disclaimer, the term of this patent is extended or adjusted under 35 U.S.C. 154(b) by 0 days.

(21) Appl. No.: 10/922,470

(22) Filed: Aug. 20, 2004

(51) Int. Cl.
 *B65B 3/04* (2006.01)
 *B67C 3/02* (2006.01)

(52) U.S. Cl. .................. 141/94; 141/104; 141/351; 222/23; 222/129.1

(58) Field of Classification Search ............ 141/351, 141/94, 104; 222/23, 129.1, 640
See application file for complete search history.

(56) References Cited

U.S. PATENT DOCUMENTS

| | | | | |
|---|---|---|---|---|
| 5,566,732 | A * | 10/1996 | Nelson | 141/94 |
| 6,443,335 | B1 * | 9/2002 | Pinedjian et al. | 141/94 |
| 6,968,876 | B2 * | 11/2005 | Yacko et al. | 141/351 |
| 7,127,236 | B2 * | 10/2006 | Khan et al. | 455/414.1 |
| 2002/0134831 | A1 * | 9/2002 | Saveliev et al. | 235/375 |
| 2003/0051767 | A1 * | 3/2003 | Coccaro et al. | 141/351 |
| 2004/0093281 | A1 * | 5/2004 | Silverstein et al. | 705/26 |
| 2004/0220824 | A1 * | 11/2004 | Imai et al. | 705/1 |
| 2005/0029287 | A1 * | 2/2005 | Mobbs | 222/129.1 |
| 2005/0087255 | A1 * | 4/2005 | Humphrey et al. | 141/94 |
| 2005/0140501 | A1 * | 6/2005 | Rizzo et al. | 340/10.51 |
| 2006/0219776 | A1 * | 10/2006 | Finn | 235/380 |

* cited by examiner

*Primary Examiner*—Timothy L Maust
*Assistant Examiner*—Nicolas A Arnett
(74) *Attorney, Agent, or Firm*—Rebecca M. K. Tapscott, Esq.; Byron A. Bilicki, Esq.; The Bilicki Law Firm, PC

(57) ABSTRACT

A beverage dispensing system has a container with an upper lip, a bottom and a cylindrical sidewall. A read/write radio frequency identification tag is on a container. A beverage dispenser has a plurality of dispensing valves associated with a plurality of different beverages. Each valve has an actuator. A reader is operatively coupled with respect to the tag for communicating with the tag and for communicating with the actuator. An electronic system is operatively coupled to the tag and the actuators and the reader.

13 Claims, 4 Drawing Sheets

BEVERAGE DISPENSING SYSTEM

FIELD OF THE INVENTION

The present invention relates to a beverage dispensing system and pertains to controlling and supervising the billing, inventorying and pouring of drinks.

Reference should be made to the accompanying drawings and descriptive matter in which is illustrated a number of possible embodiments of the invention.

BRIEF DESCRIPTION OF THE DRAWINGS

The embodiments of the invention will be better understood when consideration is given to the following detailed description. Such description makes reference to the annexed drawings.

The same reference numerals refer to the same parts throughout the various Figures.

DESCRIPTION OF THE EMBODIMENTS OF THE INVENTION

Figure 1:
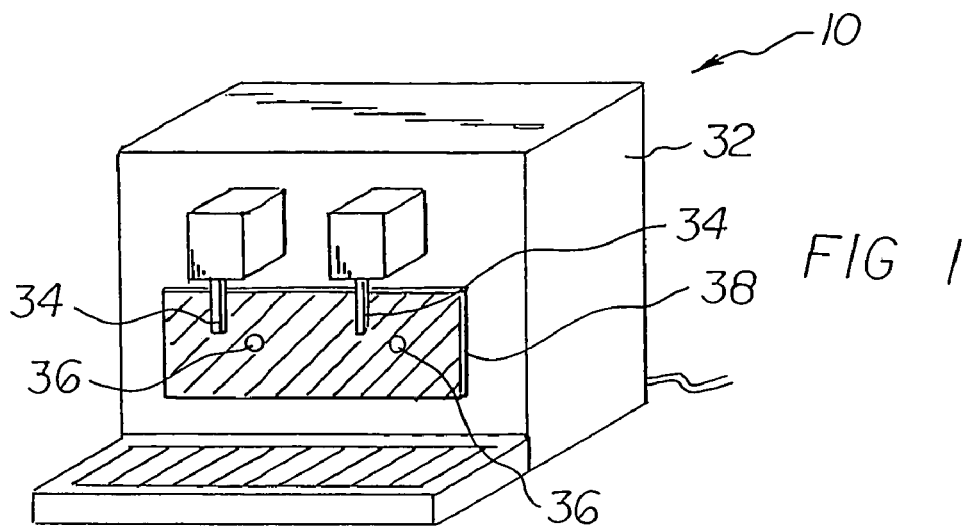
FIG. 1 is a perspective illustration of a RFID dispensing system.

With reference now to the drawings, and in particular to FIG. 1, beverage dispensing system 10 is comprised of a plurality of components. Such components include container 14, read/write radio frequency identification tag 28 on container 14, beverage dispenser 32, reader 38, electronic system and antenna 46 for sending the information to RFID tag 28. Such components are individually configured and correlated with respect to each other so as to attain the intended objective.

First provided is cup 14. Cup 14 is generally cylindrical configuration with an inner wall 16 and an outer wall 18 defining an intermediate air space. Cup 14 further has an upper lip 20 and a bottom 22. Cup 14 has a cylindrical sidewall 24 between upper lip 20 and bottom 22. Cup 14 may be any other type of container such as glass, paper, bottle or ice bucket as for ice.

Figure 3:
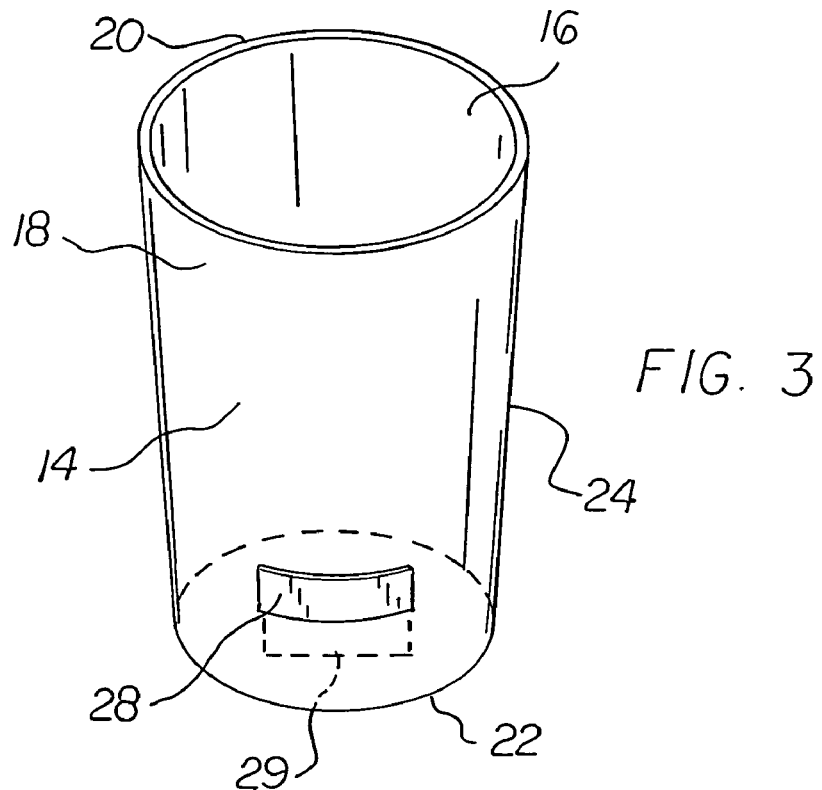
FIG. 3 is a perspective illustration of a cup for receiving fluids or other material dispensed from the system shown in FIGS. 1 and 2.
Figure 4:
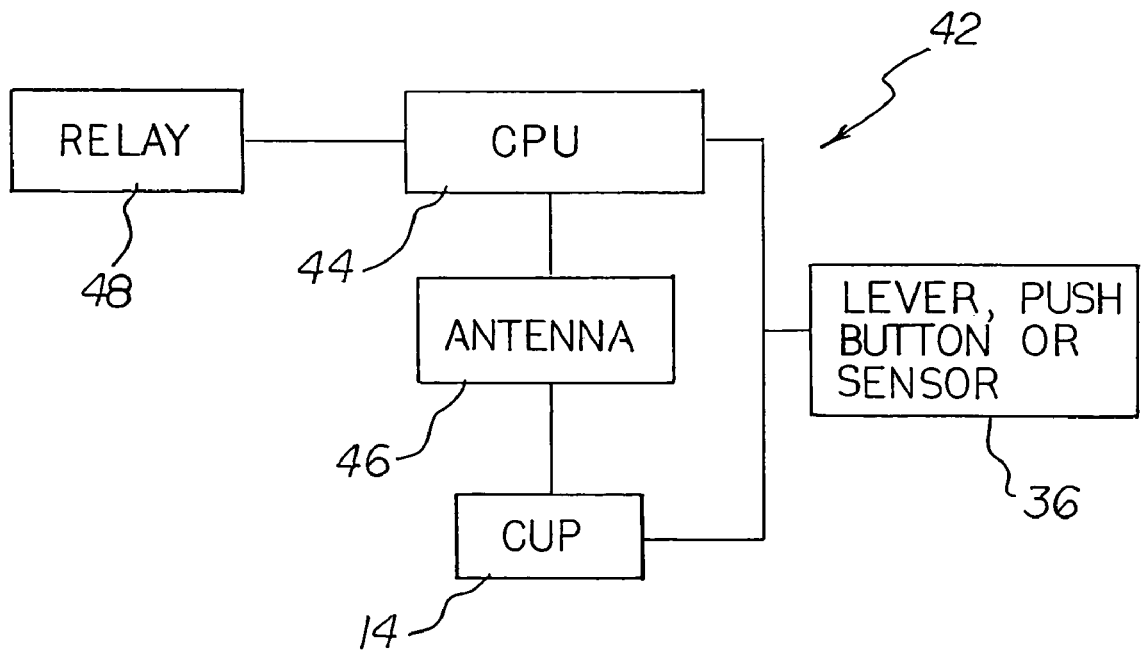
FIG. 4 is a block diagram of the circuitry employed in the dispensing system of FIGS. 1 and 2.

Next provided is an ISO 15693 certified read/write 13.56 MHz RFID, hereinafter radio frequency identification, tag 28 on the container. Tag 28 may be passive or active and is adapted to store information relating to a purchase. Tag 28 may be positioned on the sidewall 24 of cup 14. Tag 28 is adapted to store information relating to purchase time and purchase date and related to the size of cup 14 and amount being purchase. In an alternate embodiment of the invention, the tag 28 is placed on bottom 22 of cup 14, as shown by the dotted line in FIG. 3.

Next, a self serve beverage dispenser 32 is provided. Beverage dispenser 32 has a plurality of dispensing valves 34 associated with a plurality of different beverages. Beverage dispenser 32 is intended to dispense beverages; such beverages may be hot or cold and may also be ice. Valve also has an actuator formed as a proximity sensor 36 for notifying the CPU that a cup is under a specific dispending head and to notify the reader and/or antenna to read information from the RFID tag. In an alternate embodiment of the invention, proximity sensor 36 is replaced by button 37 for each valve 34 to initiate dispensing. CPU 44 is inside dispensing unit 32.

A reader 38 is next provided. Reader 38 is located in a vertical plane in the proximity of dispenser 32 beneath valves 34. Reader 32 is operatively coupled with respect to tag 28 for communicating with tag 28 and for communicating with CPU 44 which communicates with the actuator. In an alternate embodiment of the invention, modified reader 39 is in a horizontal plane in front of and beneath beverage dispenser 32. Antenna 46 may be, for example, a read/write antenna which enables the RFID system to send information back to RFID tag 28 in cup 14 to be stored for various uses, for example, for promotions (some are described, infra.) or for pre-paid debit/credit transactions. Alternate embodiments may includes supplemental antenna 35 which is a separate, smaller antenna, and may either be a read only antenna or a read/write antenna. An example of one embodiment where supplemental antenna 35 is provided is where an RFID card is used in place of tag 28; supplemental antenna 35 enables the use of an existing RFID card with beverage dispensing system 32. Examples of existing RFID cards include, for example, debit/credit cards currently being used in the market.

Next, electronic system 42 is provided. Electronic system 42 is operatively coupled to tag 28 and actuators and reader 38. Electronic system 42 includes CPU 44, and antenna 46 and tag 28 with actuator coupled to cup 14 and CPU 44 and has relay 48 coupled to valves 34 and/or ice dispenser.

Figure 5:
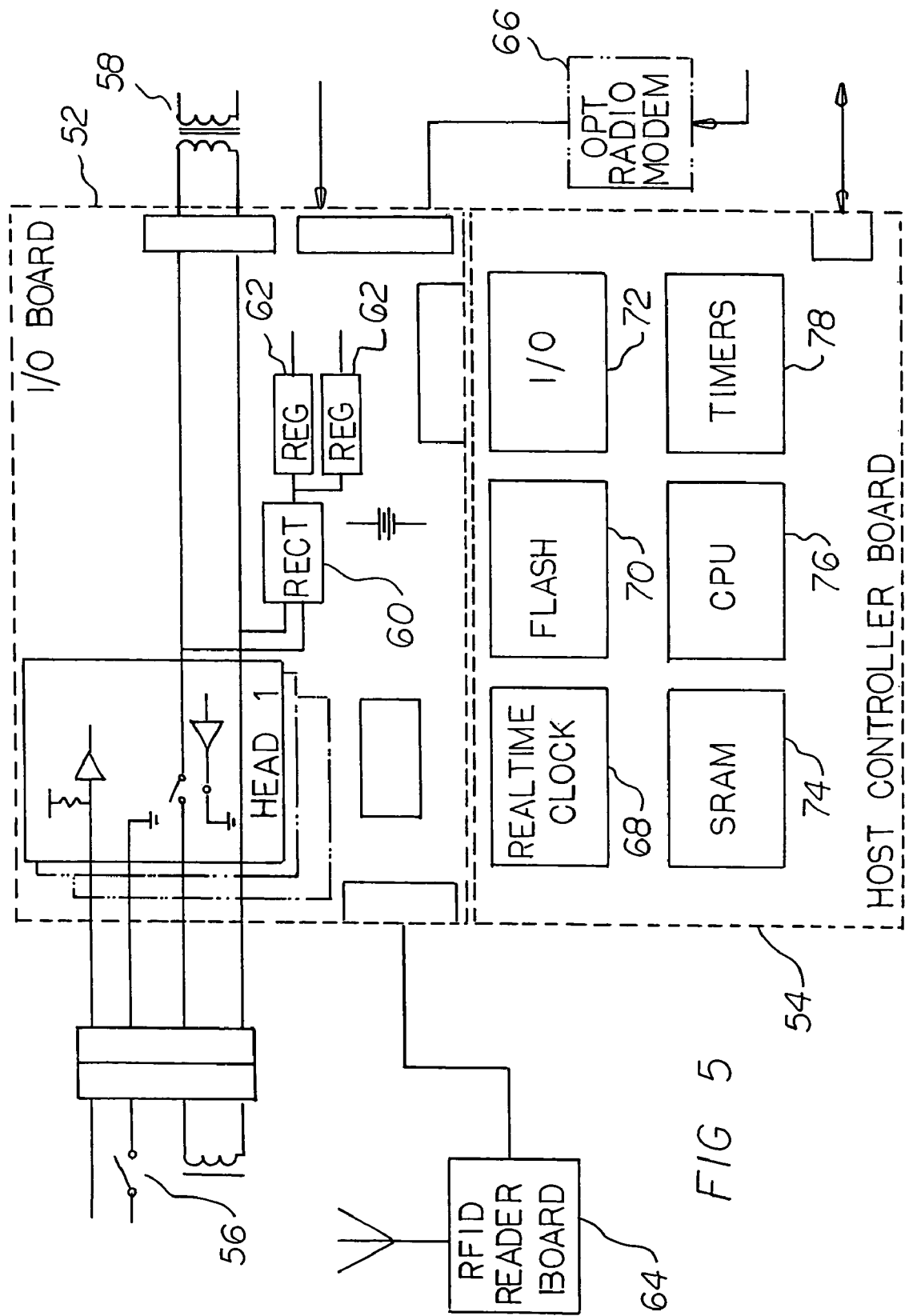
FIG. 5 is a circuit diagram of the system of the prior Figures including the I/O board and host controller board as well as inputs and outputs.
Figure 6:
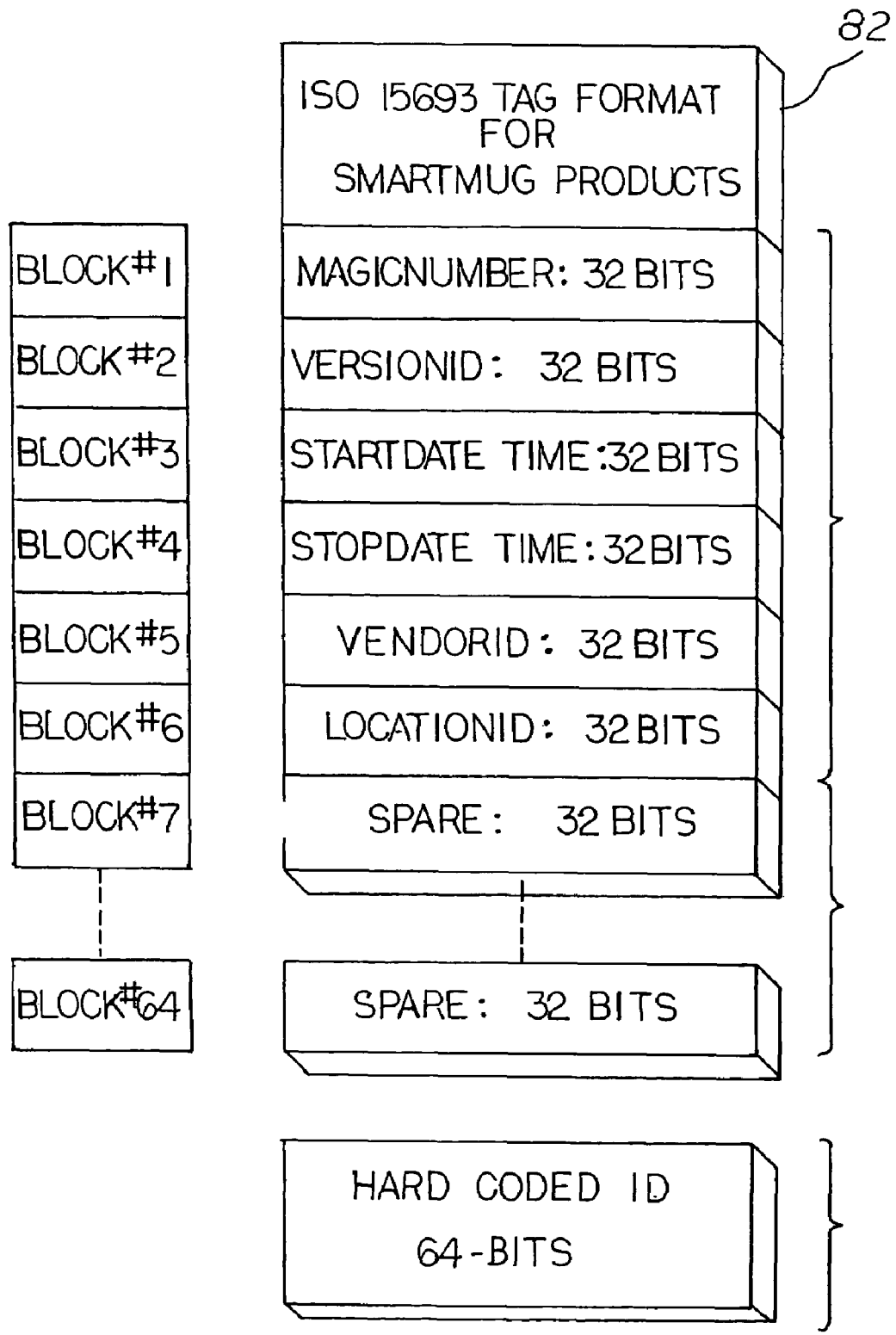
FIG. 6 is a block diagram of one example of a tag configuration, being the ISO 15693 Tag Format for the RFID MUG products.

Electronic system 42 also includes input/output (I/O) board 52 and host controller board 54. FIG. 5 is a block diagram of the RFID beverage dispenser circuitry. I/O board 52 includes off/on switch 56 and power providing transformer 58 and rectifier 60 and regulators 62. Electronic system 42 also includes RFID reader board 64 and Optical Radio Modem 66 inputting I/O board 52. Host controller board 54 includes Realtime Clock 68, Flash 70, I/O 72, SRAM, CPU 76 and timers 78.

An example of the configuration of tag 28 is ISO 15693 Tag Format for SMARTMUG PRODUCTS is a 64 block sub system 82. The first six blocks are required information with the remaining blocks for future expansion and with the final 64 bit block used to identify multiple tags and with Block 1 being a MAGICNUMBER: 32 bits, Block 2 being a VERSIONID: 32 bits, Block 3 being a SMARTDATE TIME: 32 bits, Block 4 being a STOPDATE TIME: 32 bits, Block 5 being a VERSIONID 32 bits, Block 6 being a LOCATIONID: 32 bits, Block 7 through Block 64 being SPARE: 32 bits. All of the blocks may be hard coded ID: 64 bits.

In one embodiment, off the shelf ISO certified RFID readers 28, antennas 46 and chips, may be used, to create a software driven system that can be manipulated to create self serve refill cup programs, track inventory of fountain beverage, ice and cup inventory.

Beverage system helps 1) control beverage theft with containers not associated with the current programs (competitors' cups); 2) calculate the exact amount of ounces and the brand being poured into each cup (time based/ounces per second: flow rate) to allow the customer to determine the average ounces poured per cup per program (price validation); 3) Just In Time inventory can be achieved; and 4) the system can determine where the cups were purchased. This enables operators to bill offsite locations for the beverages poured at their locations. For example, a location receives the money for a free refill mug, but the visitor goes to a different location and pours the beverage; through RFID tracking these billing discrepancies may be resolved, ensuring that the vendor expending the beverage is reimbursed.

One embodiment uses a software and hardware driving system that uses off the shelf ISO RFID products, which avoids inconsistent industry standards or discrepancies in quality.

This embodiment would use, for example, ISO 15693 certified read/write 13.56 MHz RFID tag, as tag 28, has the ability to read through water, human tissue and plastic. ISO certified (15693) tags are individually numbered giving the system the ability to individually track each cup 14 in the system. Tags 28 are also adapted to have anti-collision identification protocols within the ISO 15693 readers allowing multiple transponder or tags to read simultaneously. Tags 28 may be passive tags, so tags 28 would not have a battery source, thereby giving the tag a longer shelf-life. RFID tag 28 is powered up by RFID antenna (write portion) 46 at the register and by RFID antenna (read portion) 46 at beverage dispenser 32. Alternatively, active tags which use a battery source may also be used.

RFID antenna (write portion) 46 at the cash register sends information (for example, location, promotion code, date, etc.) to RFID tag 28 in bottom 22 of cup 14.

Figure 2:
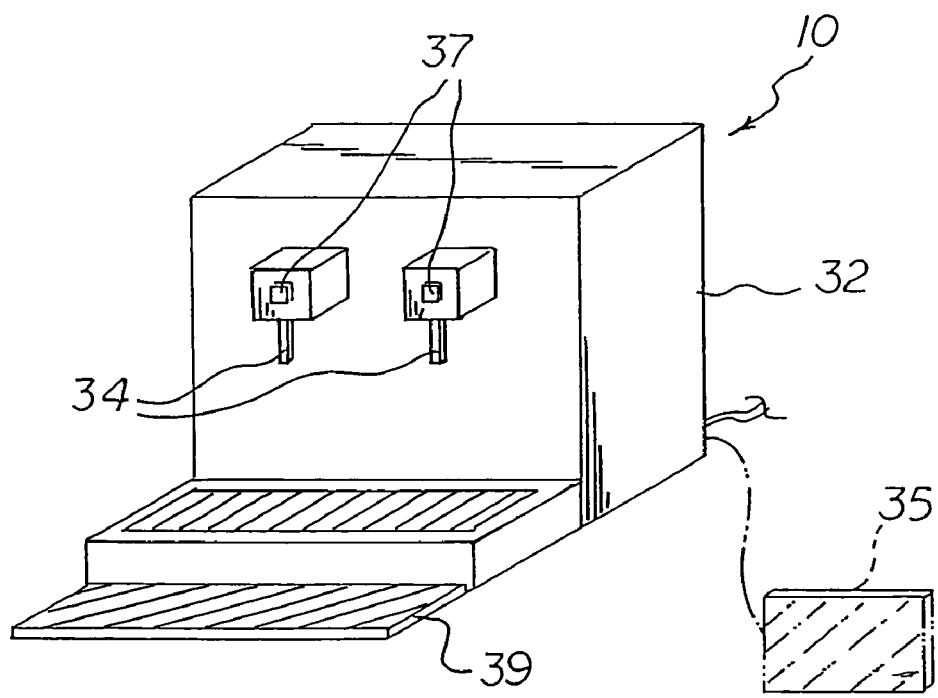
FIG. 2 is a perspective illustration of a RFID dispensing system.

After cup 14 is purchased, the customer will go to beverage dispenser 32 to receive a beverage. One embodiment includes single antenna 46, read station 38, that spans across the length of the dispensing heads. Antenna 46 can be placed in a plurality of locations, for example, on the back panel above the drip pan or in front of the drip pan, as shown in FIGS. 1 and 2, respectively. Antenna 46 is constantly looking for RFID tag 28 in the reading field. Once antenna 28 finds valid RFID tag 28, all dispensing heads of beverage dispenser 32 will be enabled for dispensing. Once a dispensing head is activated, the other heads will be disabled.

If multiple consumers are pouring a beverage at the same time, the beverage dispensing system is capable of determining which brand is being poured into an RFID tagged cup. For example, in one embodiment, antenna 46 will not read into the reading field to validate cup 14 until after a dispensing activator, for example, a lever or push button 37 (on/off switch) is engaged. Upon engaging the dispensing actuator, beverage dispenser 32 reads the field for information. Thus, the electronic system of the beverage dispenser can determine under which dispensing valve the RFID tagged cup is positioned. The valve and brand of beverage corresponding to the actuator that is engaged is associated with the tag that is read when that particular actuator is engaged by a user. In another embodiment, antenna 46 will not read into the reading filed to validate cup 14 until after infrared proximity sensor(s) 36 detects that cup 14 is under a dispensing head. Sensor 36 will notify antenna 46 on beverage dispenser 32 to read the field for information. In a further embodiment, antenna 46 is constantly reading the field. As cup 14 enters the reading field it is time stamped by Host Controller Board/PCB 54 of the electronic system. As multiple cups 14 enter the field each cup 14 is time stamped and read for information individually. The first cup 14 that engages dispensing actuator or is read by infrared proximity sensor 36 will be "classified" as the "first cup" to enter the reading field, and will be matched with the information received from cup's 14 RFID tag 28 with the first in time stamp.

Fluids may be calculated by the ounces of a beverage being poured into cup 14 using time based flow rate calculations.

As a result of using infrared proximity sensors 36 to detect where cup 14 is located, lever or a push button features may be eliminated, which may reduce wear and tear of the unit, as there are no moving parts. Also, such an embodiment may aid with sanitary issues, as it will be easier to clean.

Host Controller Board (PCB) 54 will provide the overall operation and data storage at beverage dispenser 32. The information can be sent using any way known in the art, for example, via cellular Ethernet (internet) or manual collection at the system. The information may then be downloaded into a main computer as for predetermined calculations.

Antenna 46 at beverage dispenser 32 may be attached any number of way. Antenna 46 is adapted to retrofit the stainless steel panel on beverage dispenser 32. RFID antenna 46 plugs into a harness that connects to a small simple computer (for example, having flash memory 70, real time clock 68, battery backed SRAM 74, small CPU 44). The small computer (for example, Host Controller Board/PCB 54) has another harness that has a relay switch for every dispensing head. This relay switch (harness) will piggyback to each dispensing head. This is a very simple electronic gate. This piggy-backed switch will always be open so that the head will be inactive and inoperable until the gate is closed. The harness that goes to the dispensing heads will also be used, if infrared proximity sensors 36 are not being used, to notify beverage dispenser 32 that cup 14 is under a certain head. If infrared proximity sensor 36 is used to determine if cup 14 is under a dispensing head, a separate harness will be used. The harness will go from Host Controller Board/PCB 54 to infrared proximity sensors 36 located on antenna 46 or beverage dispenser 32.

The following is the flow of cup 14:
a) Cup 14 is purchased and information is sent to RFID tag 28 using write antenna 46 at the register;
b) Cup 14 is placed under the dispensing head and cup's 14 position is located by infrared proximity sensor 36, lever (not shown) or On/Off push button 37 on the dispensing head;
c) Read antenna 46 reads the information on RFID tag 28 after antenna 46 is notified to do so (steps 1 & 2 above). In an alternative embodiment, antenna 46 will constantly be reading the information on RFID Tags(s) 28 so cup(s) 14 can be time stamped and the information from RFID tag 28 can be stored (3 above). The collected information from any scenario can be used to verify cup's 14 validity.
e) If cup 14 is valid, a signal is sent through another harness, from Host Controller Board/PCB 54 to the dispensing head. This harness has a relay switch that is piggy-backed on the dispensing head. The valid signal will close relay switch gate allowing the beverage to be dispensed.
f) Dispensing head will stop dispensing after cup 14 is moved away from proximity sensor 36, dispensing activator is deactivated, or the allotted ounce capacity for cup 14 has been reached.

The system is software driven so that promotions are endless. For example, more frequent visits at a store may be encouraged with refill program Rewards programs may be implemented, for example, awarding customers points for using cup 14 at the store chain. Such promotions are known, generally. Another example of a rewards program may be when the buyer receives five free refills with the purchase of ten refills. Unlike other promotions, these do not require a card or ticket, but rather, promotions are synced with tag 28. Further, vendors can track promotions more accurately by using the previously described RFID tracking system and accounting readouts.

With respective to the above description then, it is to be realized that the optimum dimensional relationships for the parts of the invention, to include variations in size, materials, shape, form, function and manner of operation, assembly and use, will be readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, which fall within the scope of the invention.

What is claimed as being new and desired to be protected by Letters Patent of the United States is as follows:

1. A beverage dispensing system comprising:
    a container having an upper lip, a bottom and a cylindrical sidewall there between;
    a read/write radio frequency identification tag coupled to the container;
    a plurality of dispensing valves, each valve of said plurality of dispensing valves being associated with a beverage;
    a plurality of actuators corresponding to said plurality of dispensing valves, each actuator being adapted to commence the dispensing of a selected beverage;
    an RF device capable of reading and writing information to and from said tag, said information including user data and purchase information, said RF device being activated to read and write information to and from said tag when one of said plurality of actuators is engaged; and
    an electronic system operatively coupled to said plurality of dispensing valves and said RF device for interpreting information received by said RF device from said tag and for opening one or more of said plurality of dispensing valves in response to said user data and purchase information, said electronic system being configured to enable said RF device to read and write information to each one of a plurality of tags by locating the position of each tag and by associating each tag with a particular actuator that has been activated by a user.

2. The system as set forth in claim 1 wherein the electronic system includes a central processing unit (CPU).

3. The system as set forth in claim 1 wherein the electronic system also includes an input/output (I/O) board and a host controlled board, the I/O board including an off/on switch and a power providing transformer and a rectifier and two regulators, the electronic system also including a RFID reader board and an Optical Radio Modem inputting the I/O board, the host controller board including a Realtime Clock, a Flash, an I/O, an SRAM, a CPU and timers.

4. The system as set forth in claim 1 wherein the tag includes an ISO 15693 Tag Format for RFIDMUG PRODUCTS which is a 64 block sub system with Block 1 being a MAGICNUMBER: 32 bits, Block 2 being a VERSIONID: 32 bits, Block 3 being a STARTDATE TIME: 32 bits, Block 4 being a STOPDATE TIME: 32 bits, Block 5 being a VENDORID: 32 bits, Block 6 being a LOCATIONID: 32 bits, Block 7 through Block 64 being SPARE: 32 bits, all of the blocks are preferably hard coded ID: 64 bits.

5. The system as set forth in claim 1 wherein the actuator is a proximity sensor.

6. The system as set forth in claim 5, wherein said RF device is activated to read when said proximity sensor senses a cup in the proximity of said plurality of dispensing valves.

7. The system as set forth in claim 1 wherein the actuator is a button for each valve to initiate the read/write antenna and the dispensing.

8. The system as set forth in claim 1 wherein the actuator is a lever for each valve to initiate the read/write antenna and the dispensing.

9. The system as set forth in claim 1 wherein the RF device is in a vertical plane in the proximity of the dispenser beneath the valves.

10. The system as set forth in claim 1 wherein the RF device is a read/write antenna in a horizontal plane in front of and beneath the dispenser.

11. The system as set forth in claim 1 and further including a supplemental read only antenna on one side of the unit for communicating with an RFID tag and for communicating with the actuator.

12. The system as set forth in claim 1 and further including a supplemental read/write antenna on one side of the unit for communicating with an RFID tag and for communicating with the actuator.

13. The system as set forth in claim 1, wherein said RF device is activated to read when one or more actuator of said plurality of actuators is activated.

* * * * *